US005227814A

United States Patent [19]

Mutou

[11] Patent Number: 5,227,814

[45] Date of Patent: Jul. 13, 1993

[54] IMAGE DISPLAY DEVICE WITH VARIABLE SPEED RECORDING

[75] Inventor: Hakaru Mutou, Yokohama, Japan

[73] Assignee: Canon Kabushiki Kaisha, Tokyo, Japan

[21] Appl. No.: 698,142

[22] Filed: May 10, 1991

[30] Foreign Application Priority Data

May 10, 1990 [JP] Japan .................................. 2-118720

[51] Int. Cl.[5] .............................................. G01D 15/06

[52] U.S. Cl. ............................ 346/153.1; 346/107 A; 346/159; 346/160

[58] Field of Search ................ 346/153.1, 107 A, 160, 346/159

[56] References Cited

U.S. PATENT DOCUMENTS

| | | | |
|---|---|---|---|
| 3,816,840 | 6/1974 | Kotz | 346/74 ES |
| 3,914,771 | 10/1975 | Lunde et al. | 346/74 ES |
| 4,096,487 | 6/1978 | Shafer | 346/110 R |
| 4,167,014 | 9/1979 | Darling et al. | 346/75 |
| 4,322,734 | 3/1982 | Ebi et al. | 346/153.1 |
| 4,491,855 | 1/1985 | Fujii et al. | 346/159 |
| 4,504,130 | 3/1985 | Bell et al. | 352/92 |
| 4,575,739 | 3/1986 | De Schamphelaere et al. | 346/160 |
| 4,683,380 | 7/1987 | Shipkowski et al. | 250/548 |
| 4,713,699 | 12/1987 | Nakamura et al. | 358/296 |
| 4,717,999 | 1/1988 | Kaneko | 346/160 |
| 4,766,447 | 8/1988 | Tsukada | 346/150 |
| 4,835,545 | 5/1989 | Mager et al. | 346/1.1 |
| 4,837,636 | 6/1989 | Daniele | 358/300 |
| 4,985,786 | 1/1991 | Arai et al. | 360/70 |
| 5,038,158 | 8/1991 | Ayers et al. | 346/153.1 |

FOREIGN PATENT DOCUMENTS

| | | |
|---|---|---|
| 0206933 | 12/1986 | European Pat. Off. . |
| 0342798 | 11/1989 | European Pat. Off. . |

*Primary Examiner*—Benjamin R. Fuller
*Assistant Examiner*—Randy W. Gibson
*Attorney, Agent, or Firm*—Fitzpatrick, Cella, Harper & Scinto

[57] ABSTRACT

An image display device forms a visible image on a belt-like recording medium supported by moving means so as to be endlessly movable. Recording at a low moving speed of the recording medium occurs when the recording medium accelerates its movement and when the recording medium decelerates its movement. Thus, the length of the recording medium can be shortened, and the recording speed is increased.

6 Claims, 12 Drawing Sheets

IMAGE DISPLAY DEVICE WITH VARIABLE SPEED RECORDING

BACKGROUND OF THE INVENTION

1. Field of the Invention

This invention relates to an image display device for forming a visible image for display on a recording medium.

2. Description of the Related Art

Various kinds of devices for forming a visible image for display in accordance with image information have been developed. One such device uses conductive magnetic toner which serves as a fine-particle developer. The toner is electrostatically applied onto a recording medium, and the resultant image is displayed.

A method has, for example, been proposed in Japanese Patent Application No. 49-44336 (1974) (corresponding to U.S. Pat. No. 3,816,840). According to this method, as shown in FIG. 10, conductive magnetic toner 51 adhered to the outer circumference of a nonmagnetic cylinder 50 is moved by a magnetic field generated by a rotating magnet 52 provided coaxially with the nonmagnetic cylinder 50. The toner 51 is passed through recording electrodes 50*a* which are densely arranged along the direction of the axis on the outer circumferential surface of the nonmagnetic cylinder 50. When the toner 51 physically contacts a recording medium 53, which comprises an insulating layer 53*a* laminated on a conductive layer (cylinder) 53*b* provided close to the non-magnetic cylinder 50, voltage is applied to the recording electrodes 50*a* from a power supply unit 54. By applying a voltage between the recording electrodes 50*a* and the conductive layer 53*b* of the recording medium 53 in accordance with image information and thereby injecting electric charges from the recording electrodes 50*a* into particles of the toner 51, the particles of the toner 51 electrostatically adhere to the insulating layer 53*a* of the recording medium 53, thus forming an image.

In an image forming device for display to which the above-described image forming method is applied, as shown in FIG. 11, the toner 51 is moved to the recording electrodes 50*a* by rotation of a magnetic roller (not shown), and particles of the toner 51 adhere or do not adhere to the recording medium 53, which is moved by a driving moving roller 55*a* and a driven moving roller 55*b*, in accordance with signal voltages from the recording electrodes 50*a*, thus forming an image.

The driving moving roller 55*a* is driven by a driving motor 56 whose speed is controlled by a control unit 58 via a motor driver 57. An encoder 59 detects the moving speed of the recording medium 53. A page memory 60 stores image information.

FIG. 12 is a timing chart corresponding to a control sequence performed by the control unit 58. Symbol "a" represents a motor control signal. In a motor speed control signal b, a high level corresponds to the moving speed of the recording medium to perform recording, and a low level corresponds to a reduced moving speed. Symbol c represents an output waveform of the encoder 59, and symbol d represents memory read pulses to be input to the page memory 60.

FIG. 13 is a timing chart when image data are output from the page memory 60 to the recording electrodes 50*a*.

When a memory read pulse e has been input to the page memory 60, a data enable signal f for requesting the output of image data, a clock signal g for transmitting image data for one line, image data h, and a strobed pulse i for applying the image data h to the recording electrodes 50*a* are output.

That is, by outputting the strobe pulse i to the recording electrodes 50*a* with a constant period while moving the recording medium 53 at a constant speed, an image can be formed on the recording medium 53 for every line with a constant interval.

However, in the above-described configuration, as shown in the timing charts of FIGS. 12 and 13, an image forming operation is started by inputting the memory read pulse e to the page memory 60 after the moving speed of the recording medium 53 has become constant. Accordingly, as shown in FIGS. 14(*a*) and 14(*b*), an image forming area is smaller than a display area of the recording medium 53, thus decreasing the efficiency of the use of the display area.

As shown in FIG. 14(*a*), the recording medium 53 may have connecting portions 53*c* of recording media on which a recording image cannot be formed. In such a case, the most efficient use of the image forming area can be realized by aligning the connecting portion 53*c* to face the recording electrodes 50*a* and starting recording from that position. However, even if such approach is taken, it is impossible to prevent the image forming area from being narrow. The same problem is present even in a recording medium not having areas on which an image cannot be recorded as described above, and in a recording medium which has a predetermined specific position to start recording or stop the recording medium.

SUMMARY OF THE INVENTION

It is an object of the present invention to solve the above-described problems of the related art discussed above.

It is another object of the present invention to provide an efficient display device.

It is still another object of the present invention to provide a display device which can shorten recording time and can be made small in size without being restricted by a recording medium, and furthermore can be made under unstable recording speed.

In accordance with one aspect of the invention, an image display device comprises a belt-like recording medium for display an image, moving means for supporting the recording medium to be endlessly moveable in a moving direction, and driving means for driving the moving means to move the recording medium. Recording means forms a visible image in a main scanning direction, transverse to the moving direction, when the recording medium is moving, and moving speed detection means detects a moving speed of the recording medium in a first phase of accelerating speed, a second phase of constant speed and a third phase of decelerating speed. Control means drives the recording means in accordance with the first, second ans third phases of moving speed of the recording medium, and a case houses the recording medium and includes an optical opening for viewing the image.

In accordance with another aspect of the invention, an image display device comprises a belt-like recording medium for displaying an image, moving means for supporting the recording medium to be endlessly moveable in a moving direction, and driving means for driving the moving means to move the recording medium.

The recording means, disposed across from the recording medium, comprises recording electrodes arranged in a main scanning direction, transverse to the moving direction, and toner supply means for supplying toner between the recording electrodes and the recording medium. The recording means forms a toner image on the recording medium by applying signal voltages to the recording electrodes when the recording medium is moving. Moving speed detection means detects a moving speed of the recording medium, and control means drives the recording means in accordance with the moving speed of the recording medium. In addition, a case houses the recording medium and includes an optical opening for viewing the image.

BRIEF DESCRIPTION OF THE DRAWINGS

FIG. 14(*b*) is a graph showing a relationship between the moving speed and recording time of the recording medium.

DETAILED DESCRIPTION OF THE PREFERRED EMBODIMENTS

An explanation will now be provided of an image forming apparatus according to a preferred embodiment of the present invention with reference to the drawings.

Figure 1:
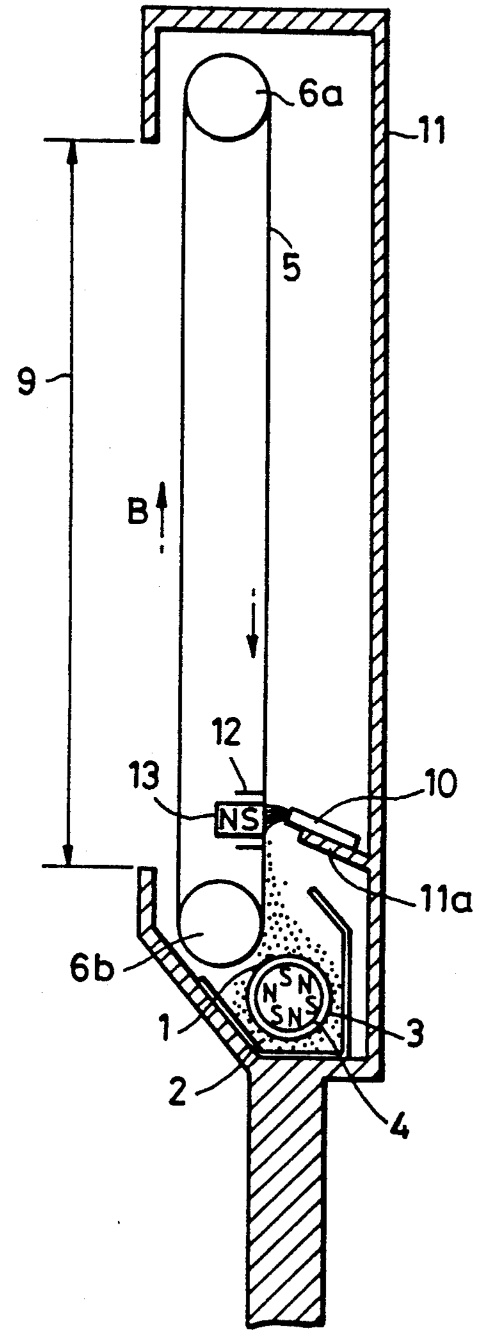
FIG. 1 is a cross-sectional view illustrating the schematic configuration of an image forming apparatus.
Figure 2:
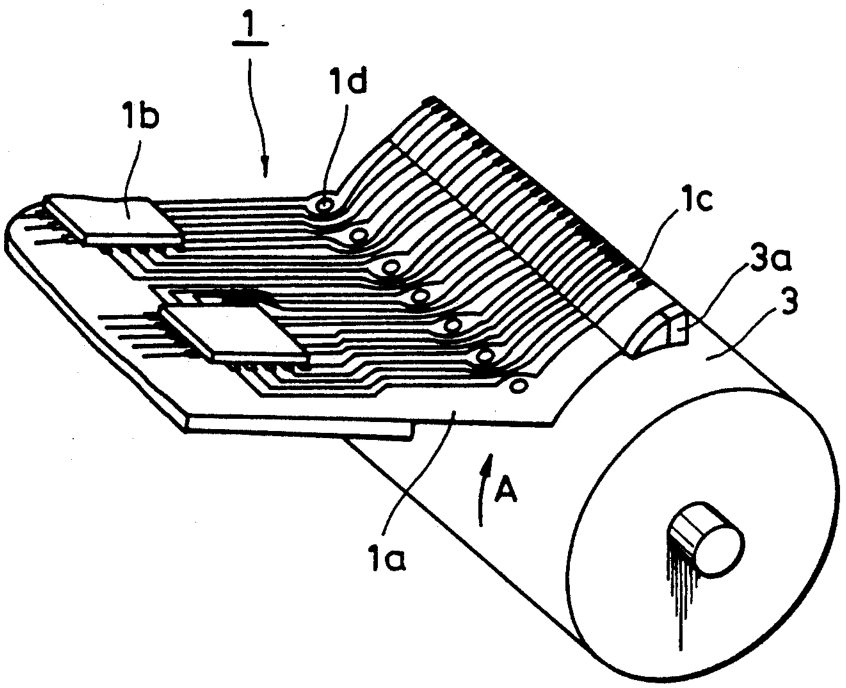
FIG. 2 is a perspective view illustrating recording electrodes.
Figure 3:
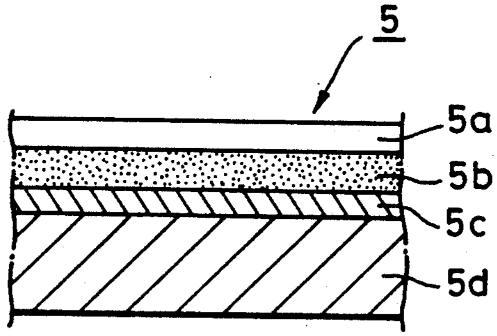
FIG. 3 is a partially-enlarged cross-sectional view of a recording medium.
Figure 4:
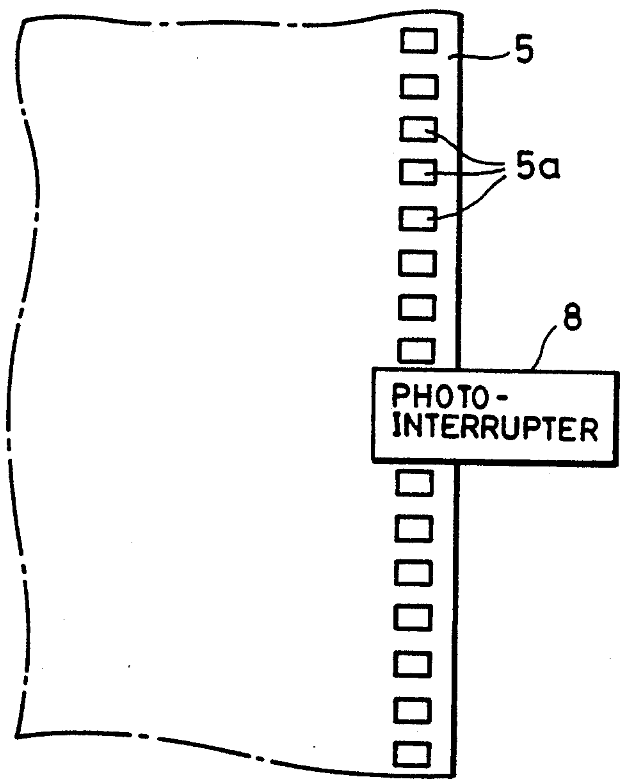
FIG. 4 is a diagram illustrating a photo-interrupter for detecting a moving speed of the recording medium.

FIG. 1 is a cross-sectional view illustrating the schematic configuration of the image forming apparatus. FIG. 2 is a perspective view illustrating recording electrodes. FIG. 3 is a partially-enlarged cross-sectional view of a recording medium. FIG. 4 illustrates a photo-interrupter for detecting a moving speed of the recording medium.

First, an explanation will be provided of the schematic configuration of the image forming appartus with reference to FIGS. 1 through 4.

In FIG. 1, recording electrodes 1 apply a charge to particles of adeveloper in accordance with image information. As shown in FIG. 2, the recording electrodes 1 are densely mounted on a projection 3*a* provided on the outer circumferential surface of a nonmagnetic cylinder 3, serving as developer supply means for supplying a conductive magnetic developer (hereinafter termed "toner") having a volume resistivity of $10^3$–$10^9$Ω·cm and a particle size of about 8 μm–15 μm, along the direction of the axis.

The recording electrodes 1 are connected to driving devices 1*b* provided on a substrata or substratum 1*a*. Recording units 1*c*, which contribute to recording, of the respective recording electrodes 1 are arranged on the projection 3*a*. A plurality of holes 1*d* are provided on the substrate 1*a* along the direction of the axis of the nonmagnetic cylinder 3. These holes 1*d* are configured so that the toner 2 moved on the outer circumference of the nonmagnetic cylinder 3 passes in the direction of arrow A and reaches the recording units 1*c*. A flexible printed circuit board is used as the substrate 1*a*. VFD drivers (MSG1163 made by Oki Electric Industry Company, Limited) are used as the driving devices 1*b*.

As shown in FIG. 1, a rotating magnet 4 is coaxially mounted on the nonmagnetic cylinder 3. The toner 2 is adhered to and moved on the outer circumferential surface of the nonmagnetic cylinder 3 by a magnetic field generated by the rotating magnet 4.

An endless-belt-like recording sheet 5, serving as a recording medium for forming an image by applying the toner 2 thereon, is disposed so that part of the recording sheet 5 is close to the recording electrodes 1. The recording sheet 5 is mounted between a tension roller 6*a* and a driving roller 6*b*, serving as moving means, which are disposed at upper and lower positions to make a pair. The driving roller 6*b* is rotatably driven by a driving motor 7 shown in FIG. 5 so as to move the recording sheet 5 in the direction of arrow B shown in FIG. 1.

As shown in FIG. 3, the recording sheet 5 is configured by a base material 5*d* made of a plastic resin, such as polyethylene terephthalate, polyethylene, polypropylene or the like, a conductive layer 5*c* about 800 Å–1000 Å thick made by depositing aluminum or ITO (an oxide of indium and tin) on the base material 5*d* in vacuum for providing a conductive property, a colored layer 5*b* about 5–30 μm thick having a volume resistivity of $10^0$–$10^7$ Ω·cm, made of a colored inorganic substance and a binder (a plastic resin, such as acrylic resin), and a surface layer 5*a* about 1–20 μm thick having a volume resistivity of $10^7$–$10^{16}$ Ω·cm, made of transparent materials comprising principally butyl resin or urethane resin.

The surface layer 5*a* and the colored layer 5*b* are electrically insulated from each other. An inorganic substance, such as titanium dioxide ($TiO_2$), aluminum oxide ($Al_2O_3$) or the like, is used for the colored layer 5*b* in order to provide a white base color for the picture surface.

As shown in FIG. 4, holes 5*a* are provided at a side end portion of the recording sheet 5 at a constant interval. A photo-interrupter 8 for detecting the moving speed of the recording sheet 5 is provided over the holes 5*a*. When the recording sheet 5 starts running, the photo-interrupter 8 outputs pulses in accordance with the moving speed of the holes 5*a*.

Each of the elements shown in block outline in FIGS. 4, 5, 9 and 11 is well known per se and its specific type or construction is not critical to carrying out the invention or to a disclosure of the best mode for carrying out the invention.

Referring again to FIG. 1, an image display portion 9 is used for displaying an image formed on the recording sheet 5 to an observer. A cleaning member 10 is mounted on a supporting member 11*a* of a back plate 11 of the main body of the apparatus. A material having a volume resistivity of $10^0$–$10^3$ Ω·cm, such as carbon fibers, a soft-type plastic (polyethylene or polypropylene) having a conductive property by forming a composite, urethane rubber, silicone or the like, is used for the cleaning member 10. A nonmagnetic member 12 for supporting the recording sheet 5 is disposed facing the cleaning member 10. There is also shown a magnet 13.

The toner 2 adhered to and moved on the outer circumference of the nonmagnetic cylinder 3 by the rotating magnet 4 passes through the holes 1*d* on the substrate 1*a* and is moved onto the recording electrodes 1. At that time, by applying voltages of about 20–40 V (volts) to the recording electrodes 1 in accordance with image information, the toner 2 adheres to the recording sheet 5, and thus an image can be formed. Particles of the toner 2 which have not contributed to image formation on the recording electrodes 1 drop from the projection 3*a* of the nonmagnetic cylinder 3, and so do not influence the image formed on the recording sheet 5.

During recording, the recording sheet 5 is moved in the direction of arrow B shown in FIG. 1 with a speed of 30–500 mm/sec by rotation of the driving roller 6*b*, and the image formed on the recording sheet 5 is displayed when the image passes through the image display portion 9. The toner 2 adhered to the recording sheet 5 passing through the image display portion 9 is removed by the cleaning member 10. The removed particles of the toner 2 drop onto the nonmagnetic cylinder 3 and are moved again to be used for the next recording.

Figure 5:
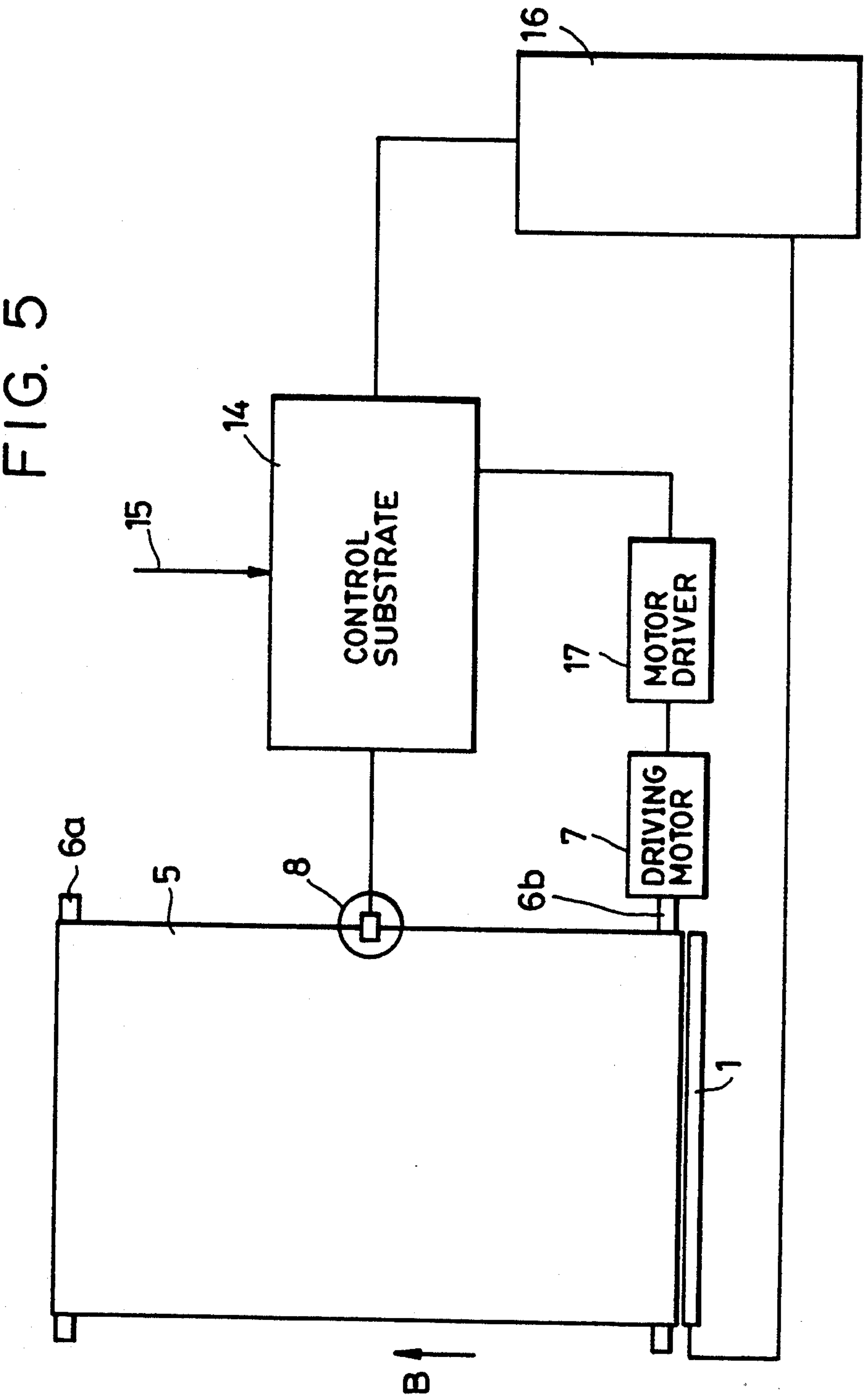
FIG. 5 is a block diagram of the image forming apparatus including a control system.

Next, an explanation will be provided of the timing of the charges to be applied to the recording electrodes 1 in accordance with the moving speed of the recording sheet 5, and a control means for changing the time of voltage application for one picture element with reference to FIG. 5. FIG. 5 is a block diagram of the image forming apparatus including a control system.

A control substrate 14 controls a recording operation for the recording sheet 5 using a recording start signal 15 from the outside. The control substrate 14 outputs read pulse signals for a page memory 16, and speed control signals for a motor driver 17 which controls the driving speed of the driving motor 7.

The page memory 16 stores image information to be recorded on the recording sheet 5. When a read pulse is input from the control substrate 14, the page memory 16 applies signal voltages to the recording electrodes 1 in accordance with image data for one scanning line.

Figure 6:
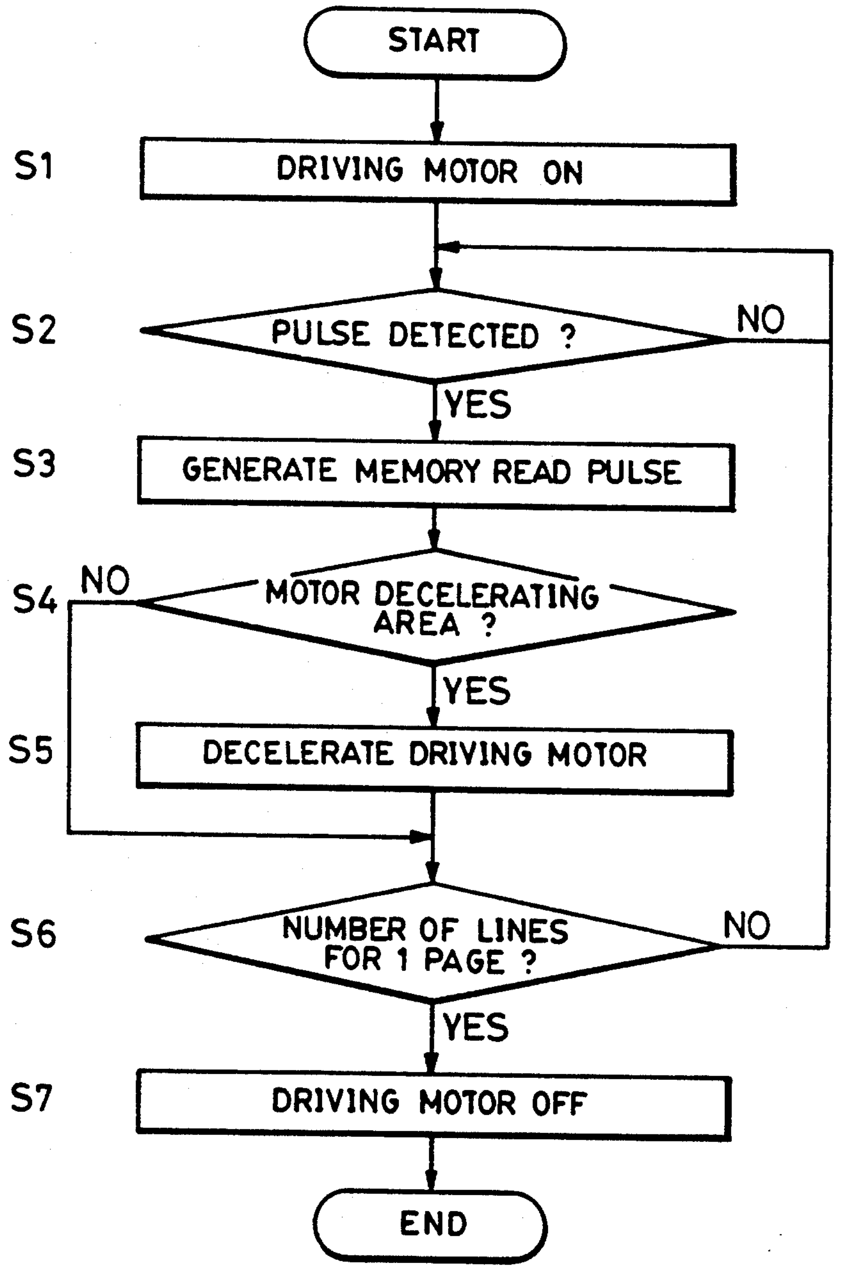
FIG. 6 is a flowchart showing a control operation.

An explanation will now be provided of a control sequence by the control substrate 14 with reference to the flowchart shown in FIG. 6.

First, at step S1, when a recording start signal 15 has been input, the control substrate 14 drives the driving motor 7 by the motor driver 17.

At step S2, it is determined whether or not a pulse signal has been input from the photo-interrupter 8. If the determination is affirmative, the process proceeds to step S3, where the control substrate 14 outputs a memory read pulse to the page memory 16 in accordance with the input pulse. When the memory read pulse has been input to the page memory 16, the page memory 16 applies signal voltages corresponding to image data for one scanning line to the recording electrodes 1 to form an image.

At the same time, the control substrate 14 counts the number of pulses output from the photo-interrupter 8. The process proceeds to step S4, where the number of pulses or the number of lines for one page is counted, and it is determined whether or not the driving motor 7 is to be decelerated. Whether or not the above-described count number is within the deceleration area for the driving motor 7 is determined so that the page memory 16 is vacant when the driving motor 7 stops.

When the count number has reached the deceleration area for the driving motor 7, the process proceeds to step S5, where the rotating speed of the driving motor 7 is decelerated by the motor driver 17.

Next, at step S6, it is determined whether or not the control substrate 14 has output memory read pulses corresponding to the number of scanning lines for one page to the page memory 16. If the determination is affirmative, the process proceeds to step S7, where the rotation of the driving motor 7 is stopped. If the result of determination is negative, the operation from step S2 to step S5 is repeated.

When the count number has not reached the deceleration area for the driving motor 7 at step S4, the recording sheet 5 is moved at a recording speed to form an image, and the process proceeds to step S6, where the same operation is repeated.

Figure 7:
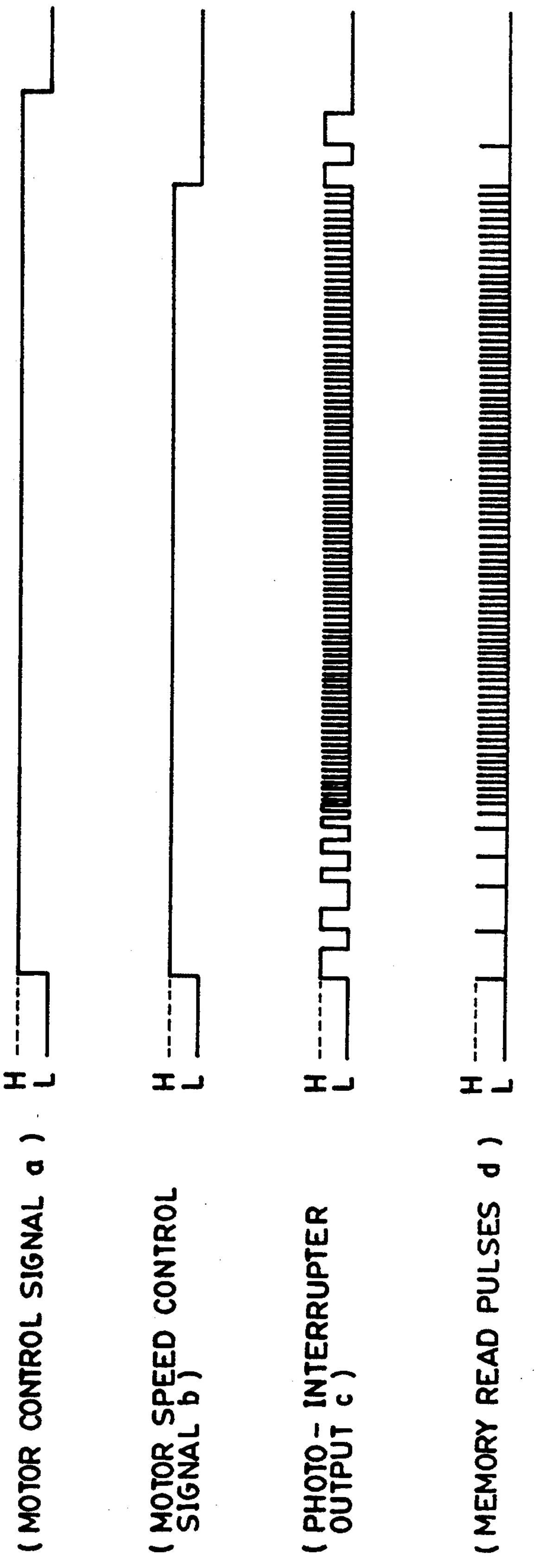
FIG. 7 is a timing chart of the control operation.

The timing chart of the above-described control operation is shown in FIG. 7. Symbol "a" represents a motor control signal for driving the driving motor 7. In a motor speed control signal b for controlling the rotating speed of the driving motor 7, a high level sets the moving speed of the recording sheet 5 to a predetermined recording speed, and a low level sets the rotating speed of the driving motor 7 to a decelerated speed for stopping the driving motor 7 via the motor driver 17. Symbol c represents an output waveform from the photointerrupter 8, and symbol d represents memory read pulses output from the control substrate 14 to the page memory 16.

According to the above-described timing chart, the control substrate 14 controls the display device so that image data for one scanning line is read from the page memory 16 in accordance with an absolute position signal of the recording sheet 5, that is, a pulse output from the photo-interrupter 8. Hence, when the moving speed of the recording sheet 5 is low, the time of voltage application for every picture element for the recording electrodes 1 is increased. As a result, it is possible to form images with an equal interval with respect to the direction of movement of the recording sheet 5.

Figure 8A:
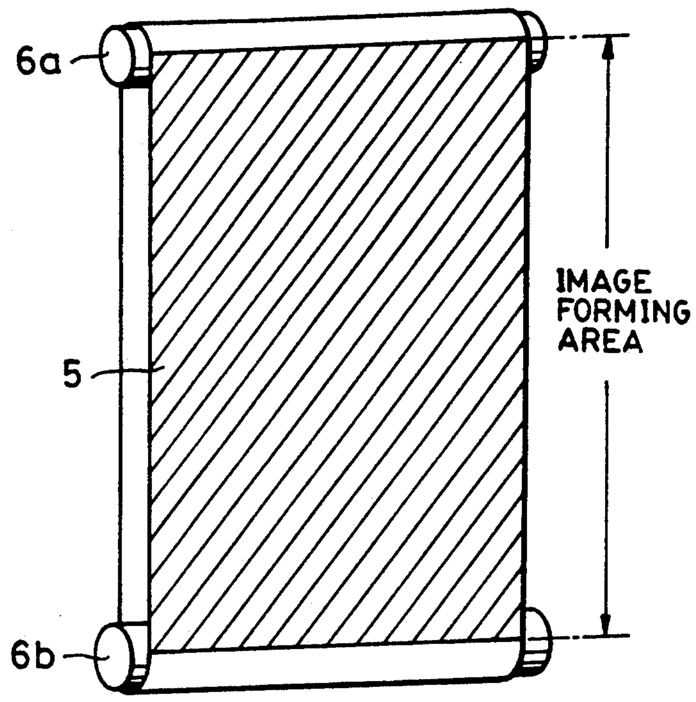
FIGS. 8(*a*) and 8(*b*) illustrate an image forming area.
Figure 8B:
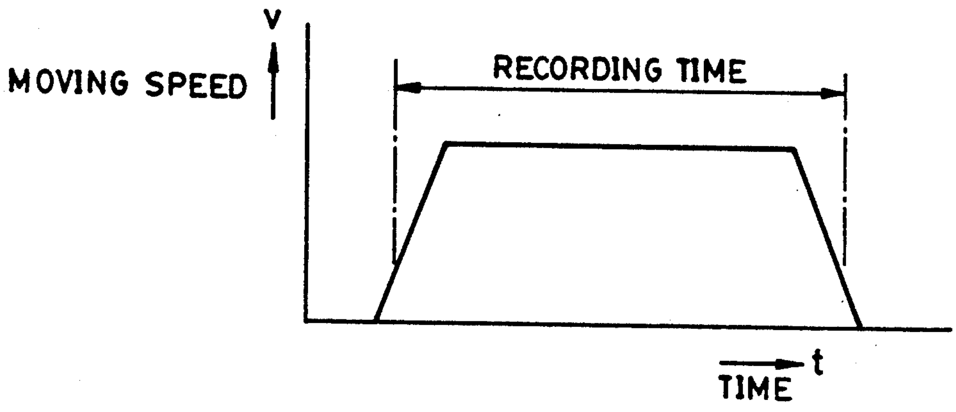

According to the above-described configuration, a signal voltage corresponding to image information for one picture element with respect to the direction of movement of the recording sheet 5 is applied to the corresponding recording electrode 1 in accordance with the moving speed of the recording sheet 5. Hence, it is possible to eliminate wasteful time which is not related to recording, such as a rise time and a fall time of the driving motor 7, and the like, and to reduce an area not forming an image of the recording sheet 5, as shown in FIGS. 8(*a*) and 8(*b*).

Accordingly, it is possible to sufficiently provide an image forming area relative to an image display area, and to efficiently use the recording sheet 5. As result, it is possible to provide a small and low-cost apparatus.

Figure 9:
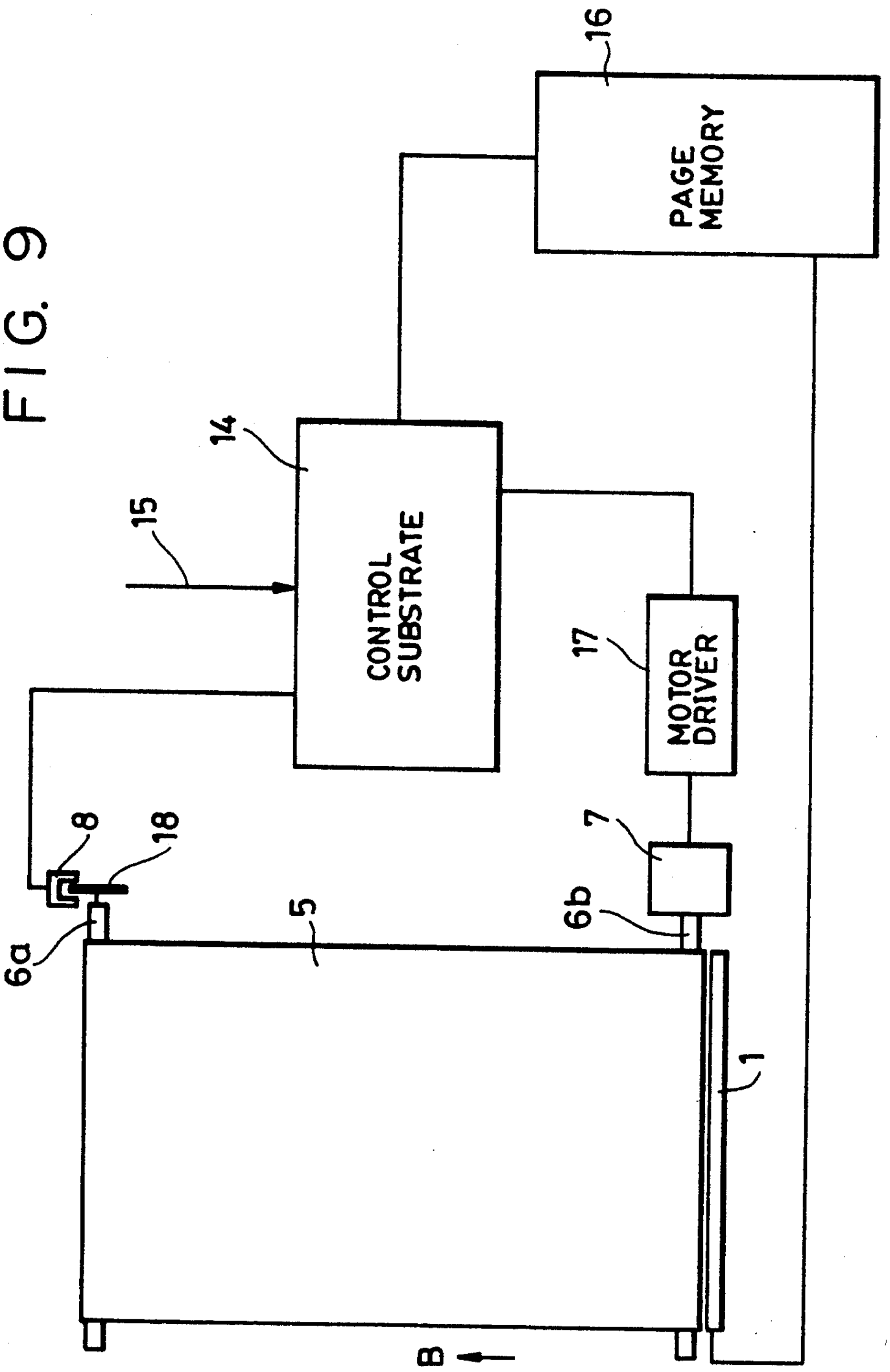
FIG. 9 is a block diagram of an image forming apparatus according to another embodiment.
Figure 10:
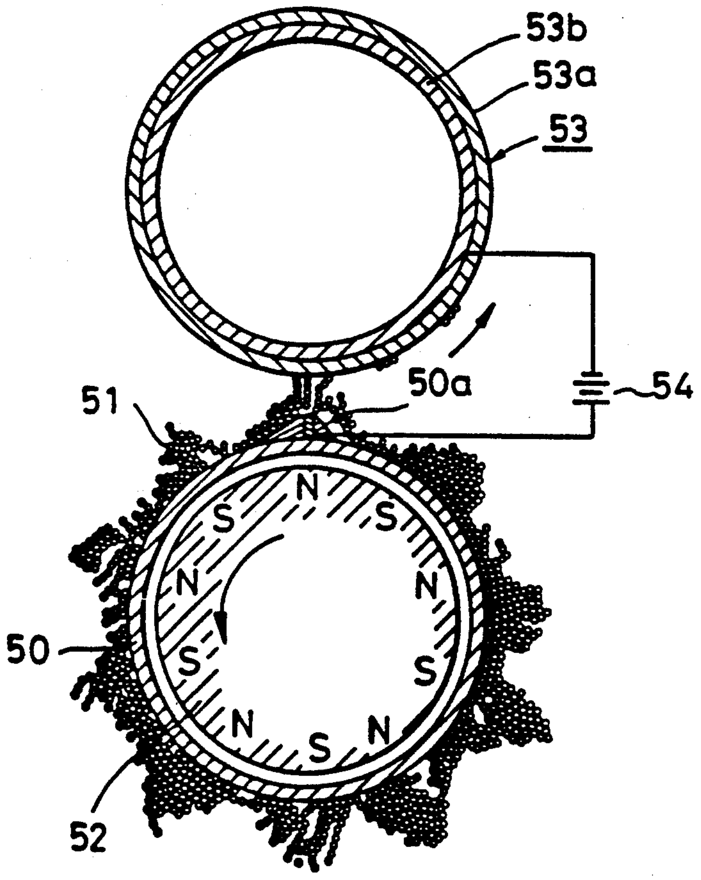
FIG. 10 PRIOR ART
FIG. 10 illustrates the image forming principle of the apparatus of the embodiments.
Figure 11:
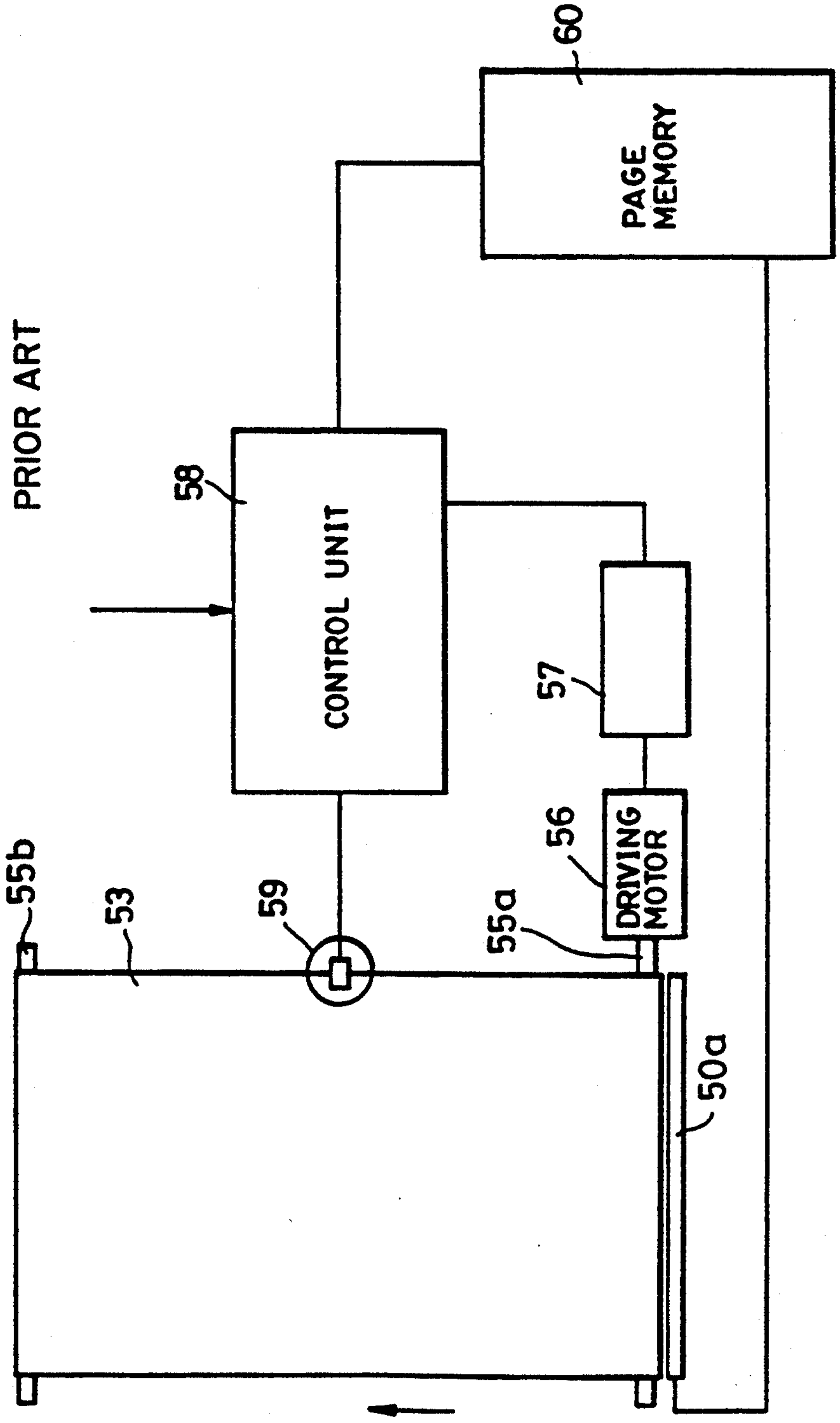
FIG. 11 PRIOR ART
FIG. 11 is a block diagram of a control unit when forming an image.
Figure 12:
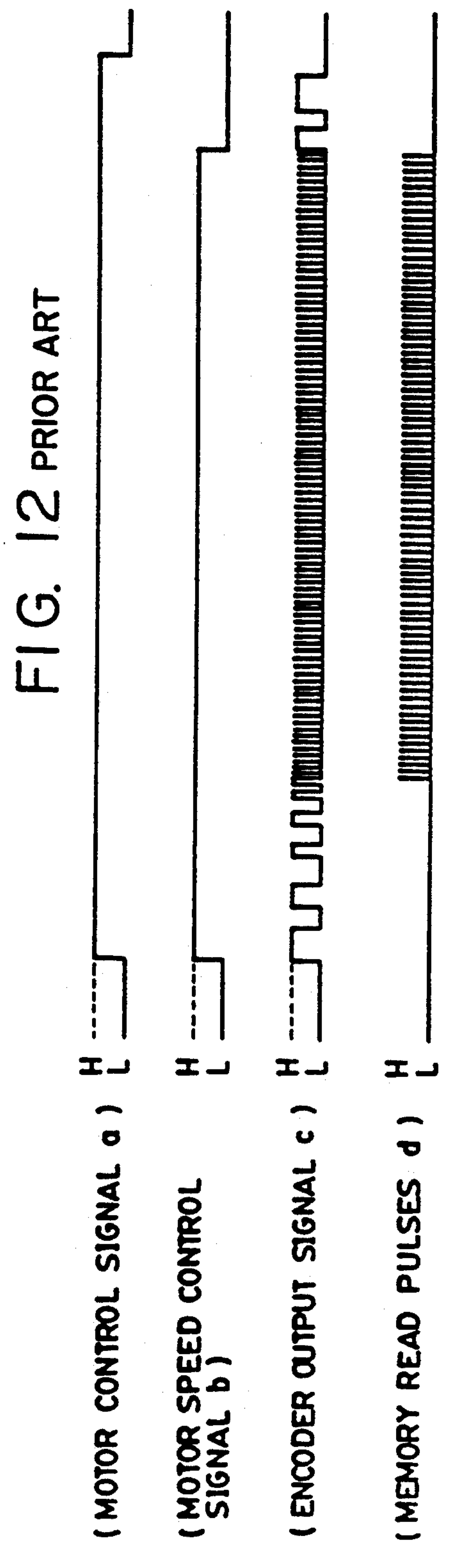
FIG. 12 PRIOR ART
FIGS. 12 and 13 are timing charts of signals when operating the unit shown in FIG. 11.
Figure 13:
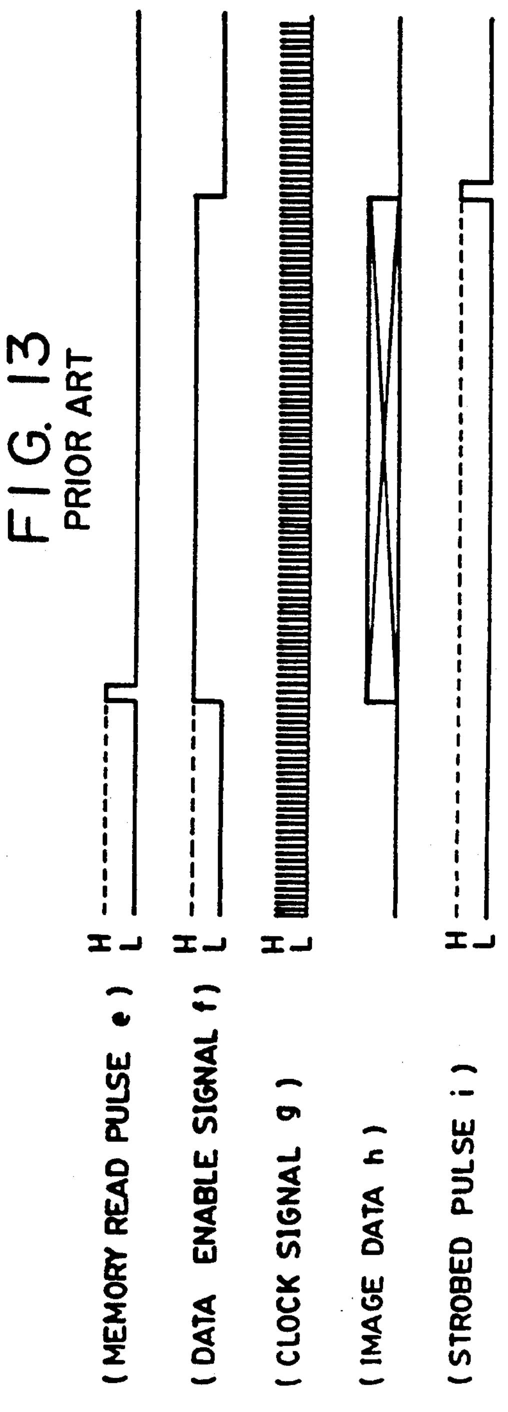
FIG. 13 PRIOR ART

In the foregoing embodiment, the moving speed of the recording sheet 5 is detected by pulse signals from the photo-interrupter 8 using the holes 5*a* provided at a side end portion of the recording sheet 5. Alternatively, as shown in FIG. 9, an encoder 18 may be mounted on the tension roller 6*a*, and the moving speed of the recording sheet 5 may be detected by a photointerrupter 8.

According to the above-described configuration, the encoder 18 may be detachably mounted. If an encoder 18 having a large number of holes is used, a high-density, i.e., high-resolution image in the direction of movement of the recording sheet 5 may be formed. If an encoder 18 having a small number of holes is used, a low-resolution image may be formed. Accordingly, it is possible to form an image with the desired resolution.

The same effect may also be obtained if a DC motor having an encoder is used for the driving motor 7.

As described above, in the foregoing embodiments, by changing the timing of the charges applied to the recording electrodes in accordance with the moving speed of the recording medium, wasteful time which does not contribute to image formation is eliminated. Furthermore, it is possible to reduce the size of the entire apparatus by reducing an area not forming an image in an image display area of the recording medium, and thus shortening the recording medium.

Accordingly, it is possible to sufficiently provide an image forming area relative to an image display area of the recording medium, and to increase the efficiency of the use of the recording medium. As a result, it is possible to provide a small and low-cost apparatus.

Figure 14:
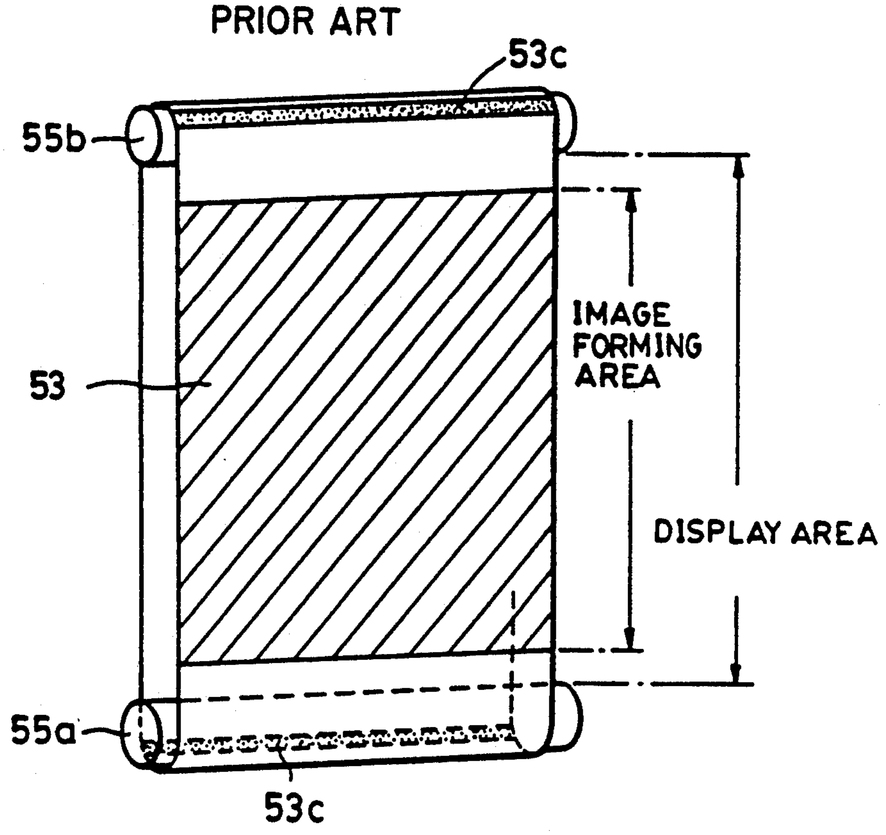
FIG. 14 (a) PRIOR ART
FIG. 14(*a*) is a perspective view of a conventional recording medium.
Figure 14:
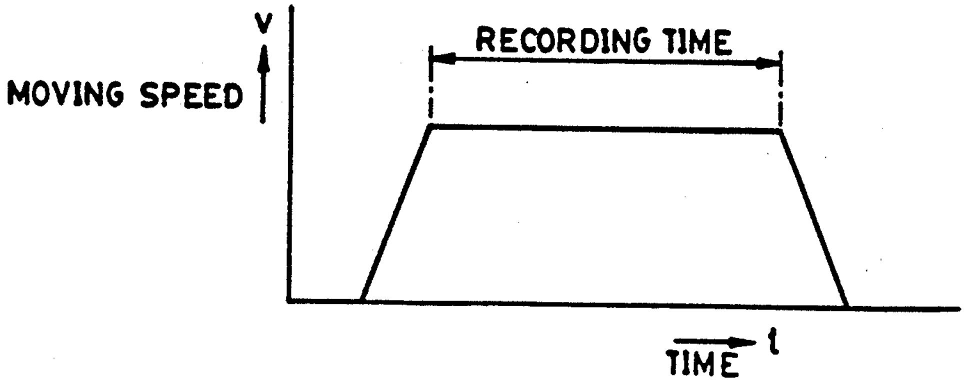
FIG. 14 (b) PRIOR ART

The above-described effects are effective for a device wherein an image forming area is predetermined as shown in FIG. 14(*a*), as well as for a device wherein an image forming area is not restricted.

As the visible image forming means, conventional means, wherein an electrostatic latent image is formed using electrostatic electrode needles and the latent image is developed by toner, may also be used.

What is claimed is:

1. An image display device, comprising:

moving means for supporting a belt-like recording medium to be endlessly movable in a moving direction;

driving means for driving said moving means to move the recording medium;

recording means for forming a visible image on the recording medium in a main scanning direction when the recording medium is moving, with the main scanning direction being transverse to the moving direction;

moving speed detection means for detecting a moving speed of the recording medium in a first phase of accelerating speed from a first stop position a second phase of constant speed and a third phase of decelerating speed to a second stop position;

control means for driving said recording means in accordance with the first and second phases of moving speed of the recording medium detected by said moving speed detection means; and a case for housing the recording medium, said case having an optical opening for viewing the image.

2. An image display device, comprising:

a belt-like recording medium for display having an end-to-end image forming area for display an image;

moving means for supporting said belt-like recording medium to be endlessly movable in a moving direction;

driving means for driving said moving means to move said recording medium;

recording means for forming a visible image in a main scanning direction when said recording medium is moving, with the main scanning direction being transverse to the moving direction;

moving speed detection means for detecting a moving speed of said recording medium in a first phase of accelerating speed, from a first stop position a second phase of constant speed and a third speed to a second stop position of decelerating speed;

control means for driving said recording means in accordance with the first and second and third phases of moving speed of said recording medium detected by said moving speed detection means; and a case for housing said recording medium, said case having an optical opening for viewing the image.

3. An image display device, comprising:

moving means for supporting a belt-like recording medium to be endlessly movable in a moving direction;

driving means for driving said moving means to move the recording medium;

recording means disposed across from the recording medium and comprising recording electrodes arranged in a main scanning direction transverse to the moving direction of said recording means, and toner supply means for supplying toner between said recording electrodes and the recording medium, said recording means forming a toner image on the recording medium by applying signal voltages to said recording electrodes when the recording medium is moving;

moving speed detection means for detecting a moving speed of the recording medium;

control means for driving said recording means in accordance with the moving speed of the recording medium detected by said moving speed detection means, wherein said control means performs recording during an accelerating and decelerating moving speed incurred when the recording medium starts to move; from a first stop position to a position of constant speed and then to a second stop position and a case for housing the recording medium, said case having an optical opening for viewing the image.

4. An image display device according to claim 3, wherein said control means performs recording during a decelerating moving speed incurred when the recording medium begins to stop.

5. An image display device, comprising:

a belt-like recording medium having an end-to-end image forming area for displaying an image;

moving means for supporting said belt-like recording medium to be endlessly movable;

driving means for driving said moving means to move said recording medium;

recording means disposed across from said recording medium and comprising recording electrodes arranged in a main scanning direction transverse to the moving direction of said recording means, and toner supply means for supplying toner between said recording electrodes and said recording medium, said recording means forming a toner image on said recording medium by applying signal voltages to said recording electrodes when said recording medium is moving;

moving speed detection means for detecting a moving speed of said recording medium;

control means for driving said recording means in accordance with the moving speed of said recording medium detected by said moving speed detection means, wherein said control means performs recording during an accelerating and decelerating moving speed incurred when said recording medium begins to start; from a first stop position to a position of constant speed and then to a second stop position and a case for housing said recording medium, said case having an optical opening for viewing the image.

6. An image display device according to claim 5, wherein said control means performs recording during a decelerating moving speed incurred when said recording medium begins to stop.

* * * * *

UNITED STATES PATENT AND TRADEMARK OFFICE

CERTIFICATE OF CORRECTION

PATENT NO. : 5,227,814
DATED : July 13, 1993
INVENTOR(S) : Mutou

It is certified that error appears in the above-indentified patent and that said Letters Patent is hereby corrected as shown below:

COLUMN 2:

Line 47, "display" should read --displaying--.

COLUMN 7:

Line 49, "position" should read --position,--.
Line 60, "display" should read --displaying--.

COLUMN 8:

Line 5, "speed," should read --speed-- and "position" should read --position,--.
Line 6, "speed to" should read --phase of decelerating speed to a second stop position;--.
Line 7, should be deleted in its entirety.
Line 9, "and third" should be deleted.
Line 39, "move;" should read --move--.
Line 41, "position" should read --position;--.

UNITED STATES PATENT AND TRADEMARK OFFICE

CERTIFICATE OF CORRECTION

PATENT NO. : 5,227,814

DATED : July 13, 1993

INVENTOR(S) : Mutou

It is certified that error appears in the above-indentified patent and that said Letters Patent is hereby corrected as shown below:

COLUMN 9:

Line 5, "start;" should read --start--.
Line 7, "position" should read --position;--.

Signed and Sealed this

Thirty-first Day of May, 1994

Attest:

BRUCE LEHMAN

Attesting Officer

Commissioner of Patents and Trademarks